(12) United States Patent
Deng et al.

(10) Patent No.: US 8,594,629 B2
(45) Date of Patent: Nov. 26, 2013

(54) METHOD AND SYSTEM FOR PROCESSING FAILURE OF HANDOVER TO CLOSED SUBSCRIBER GROUP CELL

(75) Inventors: Yun Deng, Shenzhen (CN); Jin Xi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 70 days.

(21) Appl. No.: 13/258,362

(22) PCT Filed: May 4, 2010

(86) PCT No.: PCT/CN2010/072431
§ 371 (c)(1),
(2), (4) Date: Feb. 8, 2012

(87) PCT Pub. No.: WO2011/017944
PCT Pub. Date: Feb. 17, 2011

(65) Prior Publication Data
US 2012/0135709 A1 May 31, 2012

(30) Foreign Application Priority Data
Aug. 11, 2009 (CN) .......................... 2009 1 0090442

(51) Int. Cl.
*H04M 1/66* (2006.01)

(52) U.S. Cl.
USPC ........... 455/411; 455/436; 455/437; 455/438; 455/439; 455/443; 455/444

(58) Field of Classification Search
USPC .......... 455/411, 436, 437, 438, 439, 443, 444
See application file for complete search history.

(56) References Cited

U.S. PATENT DOCUMENTS

| 2009/0005099 | A1  | 1/2009 | Jung et al. |
| 2009/0047960 | A1* | 2/2009 | Gunnarsson et al. ......... 455/436 |
| 2009/0061858 | A1  | 3/2009 | Rajasimman et al. |
| 2010/0157944 | A1* | 6/2010 | Horn ............................. 370/331 |
| 2010/0161794 | A1* | 6/2010 | Horn et al. .................... 709/224 |

FOREIGN PATENT DOCUMENTS

| CN | 101466125 A | 6/2009 |
| WO | 2005120183 A2 | 12/2005 |

OTHER PUBLICATIONS

International Search Report in international application No. PCT/CN2010/072431, mailed on Aug. 26, 2010.
English Translation of the Written Opinion of the International Search Authority in international application No. PCT/CN2010/072431, mailed on Aug. 26, 2010.

* cited by examiner

*Primary Examiner* — Barry Taylor
(74) *Attorney, Agent, or Firm* — Oppedahl Patent Law Firm LLC

(57) ABSTRACT

A method and system for processing failure of a handover to a CSG cell are provided, which are used to solve the technical problem of the interface signaling consumption and network performance degradation caused by the handover of a UE to a non-member CSG cell. When the UE is not an authorized subscriber of a target CSG cell, a core network notifies a source NodeB of the non-member failure information, thereby enforcing the UE to update an allowed CSG list to prevent the source NodeB or a source Radio Network Controller (RNC) or a source HNB from sending a handover required signaling to identical target cells, or prevents the UE from sending a handover request to identical target cells frequently by setting a delay timer, or the source NodeB or the source RNC or the source home NodeB prevents the UE from handing over to a neighboring CSG cell with identical CSG Identity (ID) under the condition of being able to acquire the CSG ID of the target CSG cell. The method and system can prevent sending the handover request signaling to identical target CSG cells again after the handover failure of the UE, thereby reducing the signal consuming between the interfaces and enhancing the performance of the network.

18 Claims, 3 Drawing Sheets

METHOD AND SYSTEM FOR PROCESSING FAILURE OF HANDOVER TO CLOSED SUBSCRIBER GROUP CELL

TECHNICAL FIELD

The disclosure relates to the field of mobile communications, particularly to a method and system for processing failure of a handover to a Closed Subscriber Group (CSG) cell.

BACKGROUND

In modern radio network system construction, in-building coverage has become the most important part in network construction. An appropriate in-building coverage scheme can give full play to the network, create more profit and save the cost of the network construction for an operator as well, realizing low investments but high returns. Thus a radio access device called a Home NodeB (HNB) emerges because of demands. The HNB is deployed in private occasions such as a home, a team, a company or a school as dedicated resources for a private subscriber. It is able to provide the subscriber with various kinds of high speed radio access services with favorable fees, and meanwhile it overcomes the inadequate coverage of an existing distributed cellular wireless communication system.

Currently, the HNB mainly has three access modes: an opened mode, a closed mode and a mixed mode. An HNB in the opened mode allows access of all subscribers, and this HNB cell thereof is a macro cell. An HNB in the closed mode only allows access of an authorized subscriber, such as a family member, a team member, etc. These authorized subscribers are called a non-public authorized subscriber group or a Closed Subscriber Group (CSG), and authorizing information is stored in a Universal Subscriber Identity Module (USIM) of a User Equipment (UE). An HNB in the mixed mode allows access of all subscribers, but a subscriber belonging to the CSG has priorities or privileges. A cell under the coverage of a macro NodeB or eNodeB is called a macro cell, and a cell under the coverage of an HNB is called a CSG cell with a CSG Identity (ID). Through determining the access mode of an HNB which a CSG cell belongs to and/or allowed CSG list (or CSG whitelist) information stored in a USIM card, a UE can determine whether a CSG cell allows it to access. For a specific UE, the number of the CSG cell allowed to access is limited. Thus the UE can store the CSG cell information which has accessed before, which is called footprint/fingerprint information. Based on the footprint/fingerprint information, the UE is able to access to the CSG cell accurately and rapidly during a reselection and a handover.

The HNB can use frequency resources reserved for the HNB by the operator, which is called a CSG dedicated frequency; it can also use identical frequency resources of the macro NodeB, which is called a mixed frequency. The cells with identical frequency are identified by a Physical Layer Identity (PCI), and when the HNB and the macro NodeB use identical frequencies, the operator reserves dedicated PCI recourses (i.e. PCI split) for the HNB, and the CSG cell uses the PCI in the PCI split. The same as the macro cell, the CSG cell has a PCI and a Cell Global Identifier (COI). Due to the limitation of the PCI, the PCI cannot solely represent one CSG cell with the wide deployment of the HNBs. However, the CGI is exclusive within a Public Land Mobile Network (PLMN), therefore the UE and the macro NodeB can only identify one CSG cell by obtaining the CGI.

With the wide deployment of the HNBs, the UE is certainly required to be handed over between the macro cell and the CSG cell or between the CSG cells in order to meet demands on mobility. Because the HNB is a plug-and-play device with mobility and is widely deployed, generally neighboring cell relation between the macro cell and the CSG cell will not be set, i.e., the UE cannot obtain information of a neighboring CSG cell when it is handed over from a macro cell to a CSG cell, and the UE needs to real-time detect and obtain information such as a CSG ID, a CGI, a Tracking Area Code (TAC) and a PLMN and the like for a handover. At the same time, because the UE has priorities or privileges in some authorized CSG cells, access control needs to be performed for the UE during a handover so that only the authorized subscriber can access the HNB cell in the closed mode. The failure of the handover access control may be caused by delayed update of the allowed CGS list reserved by the UE, or by a malicious UE which intends to access the CSG cell in the closed mode to get priorities or privileges. The current protocol does not involve this issue. If a proper processing method is not adopted, the UE may still assume that the CSG cell is accessible, and continue sending a measurement report. A network side may send a handover request to a target CSG cell again after receiving the measurement report, which results in signaling consumption between interfaces and affecting performance of the network.

SUMMARY

Therefore, the purpose of the disclosure is to provide a method and system for processing failure of a handover to a CSG cell to solve the technical problem of interface signaling consumption and network performance degradation caused by the handover of a UE to the one non-member CSG cell. To achieve the above purpose, the technical solution is realized as follows.

A method for processing failure of a handover to a Closed Subscriber Group (CSG) cell is provided, which comprises:

sending a handover required signaling or a relocation required signaling for handing over to a target CSG cell to a core network by a source NodeB, or a source Radio Network Controller (RNC) or a source Home NodeB (HNB); and if a User Equipment (UE) to be handed over is not an authorized subscriber or a member subscriber of the target CSG cell, or the target CSG cell is not in an allowed CSG list of the UE to be handed over, then sending a handover preparation failure signaling or a relocation preparation failure signaling with non-member reason to the source NodeB, or the source RNC or the source HNB which sends the handover required signaling or the relocation required signaling by the core network.

Further, the core network, or a target HNB gateway, or a target HNB may perform access control, and determine whether the UE to be handed over is an authorized subscriber or a member subscriber of the target CSG cell, or whether the target CSG cell is in the allowed CSG list of the UE to be handed over.

When the target HNB gateway or the target HNB performs the access control, the core network may send a handover request signaling or a relocation request signaling to the target HNB or the target HNB gateway, or to the target HNB through the target HNB gateway after receiving the handover required signaling or the relocation required signaling; when the target HNB or the target HNB gateway determines that the UE to be handed over is not an authorized subscriber or a member subscriber of the target CSG cell, or the target CSG cell is not in the allowed CSG list of the UE to be handed over, it may return a handover failure signaling or a relocation failure signaling with non-member reason to the core network; after the core network receives the handover failure signaling or the relocation failure signaling with non-member reason, it may send the handover preparation failure signaling or the relocation preparation failure signaling with non-member reason to the source NodeB, or the source RNC or the source HNB which sends the handover required signaling or the relocation required signaling.

Further, after receiving the handover preparation failure or the relocation preparation failure signaling, the source NodeB, or the source RNC or the source HNB may notify the UE to be handed over to perform an update of the allowed CSG list, or the network side may trigger the UE to be handed over to perform an update of the allowed CSG list.

The network side may notify the UE to be handed over to perform the update of the allowed CSG list through an air interface signaling, or the network side may trigger the update of the allowed CSG list of the UE to be handed over through a C1 interface, or the core network may perform the update of the allowed CSG list of the UE to be handed over.

Further, after receiving the handover preparation failure signaling or the relocation preparation failure signaling, the source NodeB, or the source RNC or the source HNB may start a timer; before the timer is overtime, the source NodeB, or the source RNC or the source HNB may prevent the UE to be handed over from sending the handover required signaling or the relocation required signaling to the target CSG cell.

Further, after receiving the handover preparation failure signaling or the relocation preparation failure signaling, the source NodeB, or the source RNC or the source HNB may prevent the UE to be handed over from sending the handover required signaling or the relocation required signaling to a target HNB cell with identical CSG ID.

Based on the above method, the disclosure also provides a system for processing failure of a handover to a CSG cell, which comprises:

a request module, in a source NodeB, or a source RNC or a source HNB, which is configured to choose a target CSG cell as a handover-target cell according to a measurement report of a UE to be handed over, and send a handover required signaling or a relocation required signaling for handing over to the CSG cell to a core network;

an access control module, in the core network, or a target HNB gateway, or a target HNB, which is configured to determine whether the UE to be handed over is an authorized subscriber or a member subscriber of the target CSG cell, or whether the target CSG cell is in an allowed CSG list of the UE to be handed over, and to send a handover preparation failure signaling or a relocation preparation failure signaling with non-member reason to a failure processing module through the core network if no; and the failure processing module, in the source NodeB, or the source RNC or the source HNB, which is configured to perform corresponding handover failure processing operation after receiving the handover preparation failure signaling or the relocation preparation failure signaling.

Based on the other aspect, the disclosure also provides a method for processing failure of a handover to a CSG cell, which comprises:

a source NodeB, or a source RNC or a source HNB sends a handover required signaling or a relocation required signaling for handing over to a target CSG cell to a core network; the target CSG cell is a CSG cell in a closed-mode;

the core network performs access control; if the access control fails, the core network sends a handover preparation failure signaling or a relocation preparation failure signaling to the source NodeB, or the source RNC or the source HNB; and the source NodeB, or the source RNC or the source HNB performs handover failure processing operation after receiving the handover preparation failure signaling or the relocation preparation failure signaling.

Further, the handover failure processing operation may comprise: the source NodeB, or the source RNC or the source HNB notifies a UE to perform an update of an allowed CSG list, or a network side triggers an update of an allowed CSG list; the network side notifies the UE to perform the update of the allowed CSG list through an air interface signaling, or the network side performs the update of the allowed CSG list of the UE through a C1 interface, or the core network performs the update of the allowed CSG list of the UE.

Further, the handover failure processing operation may comprise: the source NodeB, or the source RNC or the source HNB starts a timer; before the timer is overtime, the source NodeB, or the source RNC, or the source HNB prevents the UE from sending the handover required signaling or the relocation required signaling to the target CSG cell.

Further, the handover failure processing operation may comprise: the source NodeB, or the source RNC or the source HNB prevents the UE from sending the handover required signaling or the relocation required signaling to a target HNB cell with identical CSG ID.

Based on the above system, the disclosure also provides a system for processing failure of a handover to a CSG cell, which comprises:

a request module, in a source NodeB, or a source RNC or a source HNB, which is configured to send a handover required signaling or a relocation required signaling for handing over to a target CSG cell to a core network;

an access control module, in the core network, which is configured to perform access control when receiving the handover required signaling or the relocation required signaling, and to send a handover preparation failure signaling or a relocation preparation failure signaling to the request module when the access control fails; and a failure processing module, in the source NodeB, or the source RNC or the source HNB, which is configured to perform corresponding handover failure processing operation after receiving the handover preparation failure signaling or the relocation preparation failure signaling.

In the disclosure, when the UE is not an authorized subscriber of the target CSG cell, the core network notifies the source NodeB, or source RNC or source HNB of the non-member error-failure information, thereby enforcing the UE to update the allowed CSG list to prevent the source NodeB or source RNC or source HNB from sending a handover required to one target cell, or preventing from sending a handover required to one target cell frequently for the UE by setting a delay timer, or preventing from handing over to a neighboring CSG cell with indentical CSG IDs for the UE under the condition of being able to acquire the CSG ID of the target CSG cell. The disclosure can prevent sending a handover required to one target CSG cell again after the handover failure of the UE, thereby reducing signaling consumption between the interfaces and enhancing performance of the network.

DETAILED DESCRIPTION

To clarify the purpose, technical solutions and advantages of the disclosure, the disclosure will be described in detail hereinafter with the embodiments in conjunction with the drawings.

Embodiment 1

Figure 1:
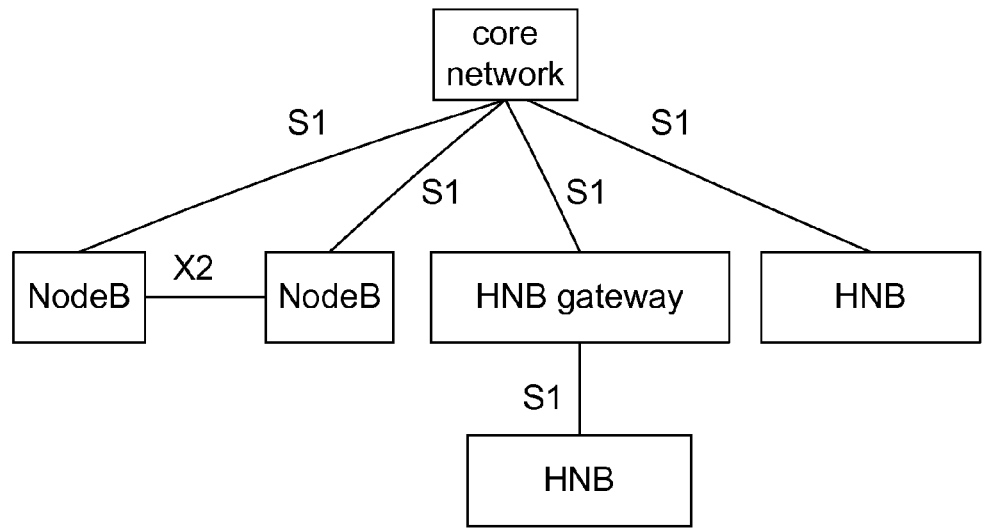
FIG. 1 shows a schematic diagram of a network layout of an LTE system.

FIG. 1 shows a schematic diagram of a network layout of an LTE system. An S1 interface is arranged between a core network and a NodeB (a macro NodeB), an X2 interface is arranged between the neighboring NodeBs; an HNB can be connected directly with the core network, or connected with the core network through an HNB gateway; there is no X2 interface arranged between the HNBs and between the HNB and the macro NodeB. A UE is located in a cell belonging to a source NodeB, and is connected; the UE has an access-allowed CSG cell list. The source NodeB may be a macro NodeB or an HNB.

Figure 2:
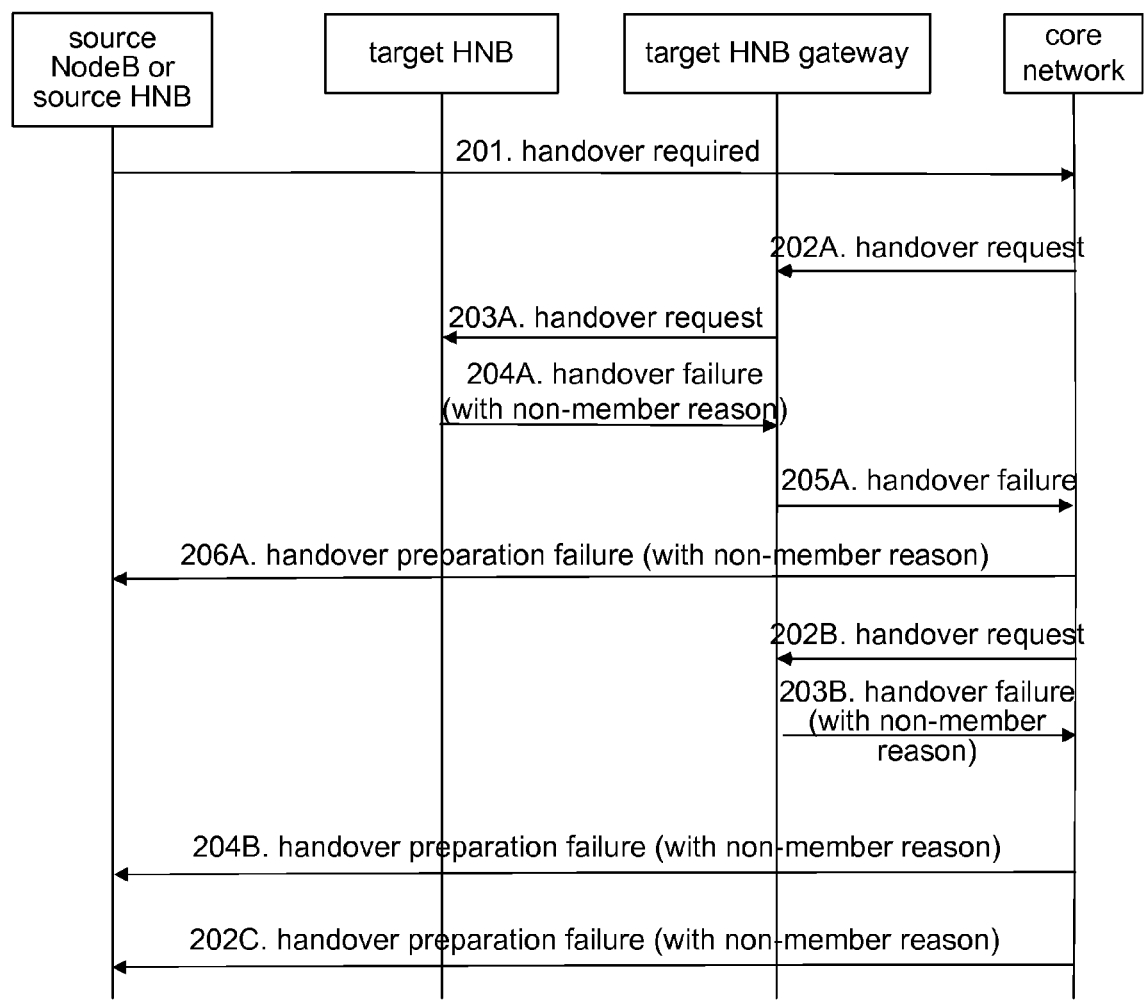
FIG. 2 shows a flowchart of a method for processing failure in handing over a UE to a target HNB cell in an LTE system according to the disclosure.

The flow of a handover of the UE is shown in FIG. 2.

Step 201: a source NodeB or source HNB determines that a UE needs to be handed over according to a measurement report submitted by the UE and a target cell to which the UE is handed over is a cell belonging to an HNB or a CSG cell; the source NodeB or the source HNB sends a handover required signaling to a core network, wherein the handover required signaling includes a UE ID and a target cell ID.

If access control is performed by a target HNB:

step 202A: after receiving the handover required signaling, the core network sends a handover request to an HNB gateway which the target HNB belongs to;

step 203A: the HNB gateway sends the handover request to the target HNB;

step 204A: the target HNB performs the access control according to an allowed CSG list of the UE, its own CSG ID and an access mode (in a closed mode); if the UE is not an authorized subscriber or a member subscriber of a target CSG cell, or the target CSG cell is not in the allowed CSG list of the UE, then the target HNB sends a handover failure signaling to the HNB gateway, wherein the signaling includes the reason that the UE is not a member, or the UE is not a member of the target CSG cell, or the CSG ID of the target HNB is not in the allowed CSG list; it should be noted that the target HNB can obtain the allowed CSG list of the UE through the handover request signaling which includes the allowed CSG list of the UE, or sending a signaling by the target HNB separately to request the core network to send the allowed CSG list of the UE;

step 205A: the HNB gateway sends the handover failure signaling to the core network;

step 206A: the core network sends a handover preparation failure signaling to the source NodeB or the source HNB, and the signaling includes the reason that the UE is not a member, or the UE is not a member of the target CSG cell, or the CSG ID of the target HNB is not in the allowed CSG list.

If access control is performed by a target HNB gateway:

step 202B: after receiving the handover required signaling, the core network sends a handover request to an HNB gateway which a target HNB belongs to;

step 203B: the target HNB gateway performs the access control according to an allowed CSG list of the UE, a CSG ID and an access mode (in a closed mode) of a target CSG cell; if the UE is not an authorized subscriber or a member subscriber of the target CSG cell, or the target CSG cell is not in the allowed CSG list of the UE, then the target HNB gateway sends a handover failure signaling to the core network, wherein the signaling includes the reason that the UE is not a member, or the UE is not a member of the target CSG cell, or the CSG ID of the target HNB is not in the allowed CSG list; it should be noted that the target HNB gateway can obtain the allowed CSG list of the UE through the handover request signaling which includes the allowed CSG list of the UE, or sending a signaling by the target HNB gateway separately to request the core network to send the allowed CSG list of the UE; the target HNB gateway stores the access mode and the CSG ID of the HNB;

step 204B: the core network sends a handover preparation failure signaling to the source NodeB or the source HNB, and the signaling includes the reason that the UE is not a member, or the UE is not a member of the target CSG cell, or the CSG ID of the target HNB is not in the allowed CSG list.

If access control is performed by the core network:

step 202C: the core network performs the access control according to an allowed CSG list of the UE, a CSG ID and an access mode (in a closed mode) of a target CSG cell; if the UE is not an authorized subscriber or a member subscriber of the target CSG cell, or the target CSG cell is not in the allowed CSG list of the UE, then the core network sends a handover preparation failure signaling to the source NodeB or the source HNB, wherein the signaling includes the reason that the UE is not a member, or the UE is not a member of the target CSG cell, or the CSG ID of the target HNB is not in the allowed CSG list; it should be noted that the core network can obtain the access mode and the CSG ID of the HNB through a registering flow of the HNB, or request the access mode and the CSG ID of the HNB from the HNB gateway by a dedicated signaling.

After receiving the handover preparation failure signaling, the source NodeB or the source HNB notifies the UE to perform an update of the allowed CSG list through an air interface signaling (a Radio Resource Control (RRC) signaling or a Non-Access Stratum (NAS) signaling, or other signaling), and the UE initiates a new tracking area update flow to update the allowed CSG list thereof; or after the UE sends a service request of the NAS, a network side sends the allowed CSG list of the UE, and then the UE performs the update. After the source NodeB or the source HNB receives the handover preparation failure signaling, the network side can perform the update of the CSG list of the UE through a C1 (OMA DM/OTA) interface.

It should be noted that when the core network performs the access control for the handover and finds that the target CSG cell is not in the allowed CSG list of the UE, the core network initiates an NAS flow to update the allowed CSG list of the UE; the core network can send the NAS signaling included in the handover preparation failure signaling, after receiving the signaling, the source NodeB or the source HNB sends the NAS information (through DownLink (DL) information transfer or other air interface signaling including the NAS information) to the UE; when receiving the NAS information, the UE updates the allowed CSG list thereof. The core network can also send the NAS signaling included in the separated NAS information (DL NAS transport) or other signaling (a E-RAB modify request or an E-RAB release command, etc.) to update the allowed CSG list of the UE.

Embodiment 2

Figure 3:
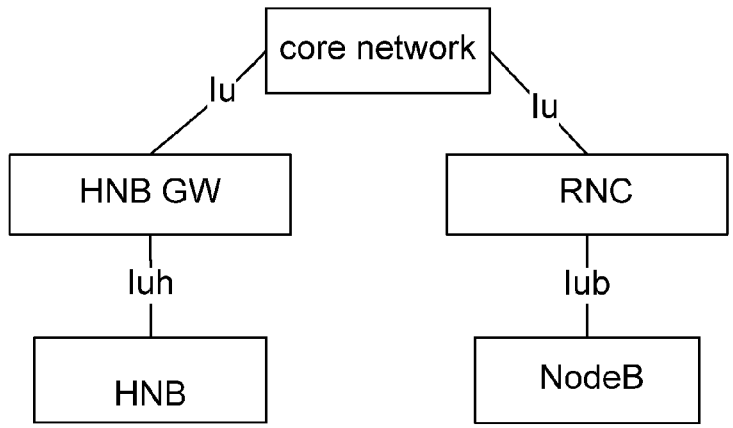
FIG. 3 shows a schematic diagram of a network layout of a WCDMA system.

In a WCDMA system, a schematic diagram of a network layout thereof is shown in FIG. 3. An Iub interface is arranged between a RNC and a NodeB belonging to the RNC; there is no interface between the NodeBs; an Iu interface is arranged between the RNC and a core network. An HNB is connected with the core network through an HNB gateway; an Iuh interface is arranged between the HNB and the HNB gateway; an Iu interface is arranged between the HNB and the core network. A UE is located in a cell belonging to a source NodeB or source HNB, and is connected; the UE has an access-allowed CSG cell list. An RNC which a source NodeB belongs to is called a source RNC; an HNB gateway which a source HNB belongs to is called a source HNB gateway.

Figure 4:
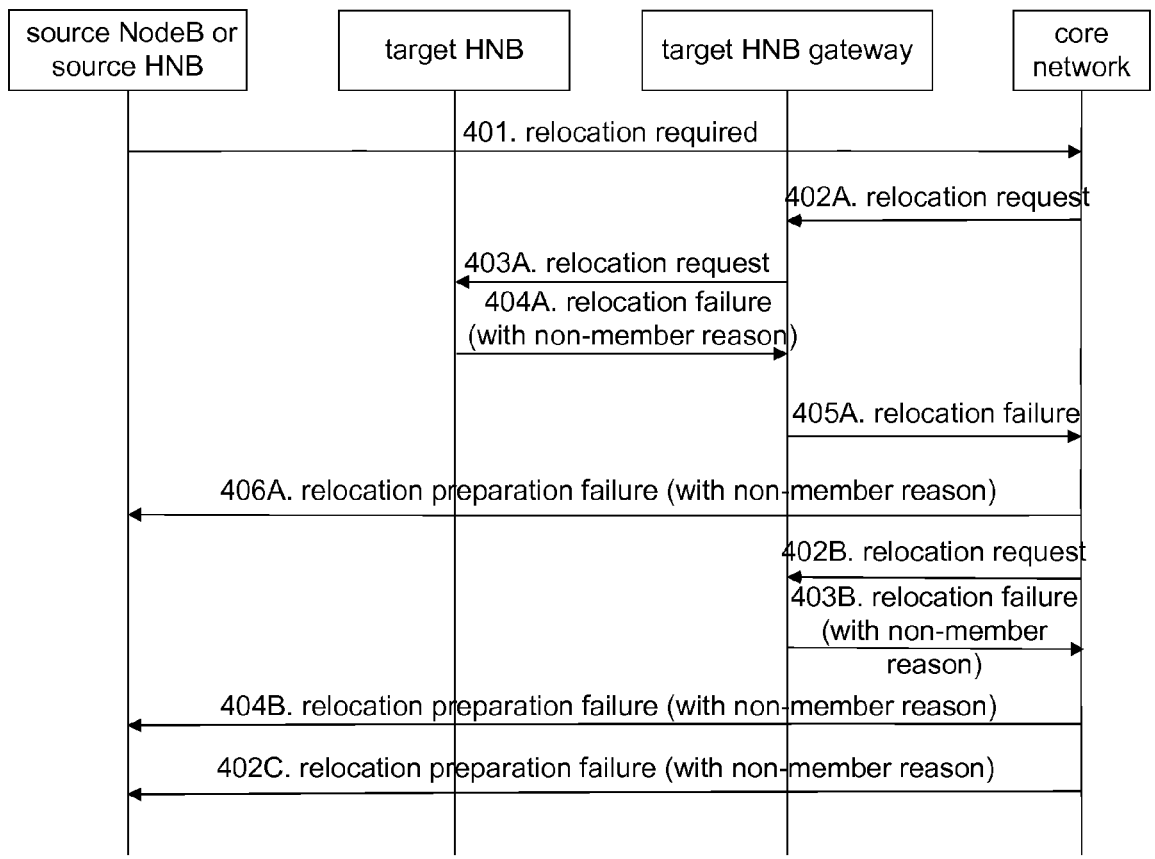
FIG. 4 shows a flowchart of a method for processing failure in handing over a UE to a target HNB cell in a WCDMA system according to the disclosure.

The flow of handing over the UE to a target HNB (in a closed mode) is shown in FIG. 4.

step 401: a source RNC or source HNB determines that a UE needs to be handed over according to a measurement report submitted by the UE, and a target cell to which the UE is handed over is a cell belonging to an HNB or a CSG cell; the source RNC or the source HNB (through a source HNB gateway) sends a relocation required signaling to a core network, wherein the relocation required signaling includes information such as a UE ID and a target cell ID, etc.

If access control is performed by a target HNB:

step 402A: after receiving the relocation required signaling, the core network sends a relocation request to a target HNB gateway which the target HNB belongs to;

step 403A: the target HNB gateway sends the relocation request to the target HNB;

step 404A: the target HNB performs the access control according to an allowed CSG list of the UE, its own CSG ID and an access mode (in a closed mode); if the UE is not a member subscriber of the target HNB (or the CSG ID of the target HNB is not in the allowed CSG list of the UE), then the target HNB sends a relocation failure signaling to the HNB gateway, wherein the signaling includes the reason that the UE is not a member, or the UE is not a member of the target CSG cell, or the CSG ID of the target HNB is not in the allowed CSG list; it should be noted that the target HNB gateway can obtain the allowed CSG list of the UE through the relocation request signaling (which includes the allowed CSG list of the UE), or sending a signaling by the target HNB separately to request the core network to send the allowed CSG list of the UE;

step 405A: the HNB gateway sends the relocation failure signaling to the core network;

step 406A: the core network sends a relocation preparation failure signaling to the source RNC or source HNB (it needs to pass through the source HNB gateway which the source HNB belongs to when sending the signaling to the source HNB, similarly hereinafter), and the signaling includes the reason that the UE is not a member, or the UE is not a member of the target CSG cell, or the CSG ID of the target HNB is not in the allowed CSG list.

If access control is performed by a target HNB gateway:

step 402B: after receiving the relocation required signaling, the core network sends a relocation request to an HNB gateway which a target HNB belongs to;

step 403B: the target HNB gateway performs the access control according to an allowed CSG list of the UE, a CSG ID and an access mode (in a closed mode) of a target CSG cell; if the UE is not a member subscriber of the target HNB (or the CSG ID of the target HNB is not in the allowed CSG list of the UE), then the target HNB gateway sends a relocation failure signaling to the core network, wherein the signaling includes the reason that the UE is not a member, or the UE is not a member of the target CSG cell, or the CSG ID of the target HNB is not in the allowed CSG list; it should be noted that the target HNB gateway can obtain the allowed CSG list of the UE through the relocation request which includes the allowed CSG list of the UE, or sending a signaling by the target HNB gateway separately to request the core network to send the allowed CSG list of the UE; the target HNB gateway stores the access mode and the CSG ID of the HNB which belongs to it;

step 404B: the core network sends a relocation preparation failure signaling to the source RNC or the source HNB, and the signaling includes the reason that the UE is not a member, or the UE is not a member of the target CSG cell, or the CSG ID of the target HNB is not in the allowed CSG list.

If access control is performed by the core network:

step 402C: the core network performs the access control according to an allowed CSG list of the UE, a CSG ID and an access mode (in a closed mode) of a target CSG cell; if the UE is not a member subscriber of the target HNB (or the CSG ID of the target HNB is not in the allowed CSG list of the UE), then the core network sends a relocation preparation failure signaling to the source RNC or the source HNB, wherein the signaling includes the reason that the UE is not a member, or the UE is not a member of the target CSG cell, or the CSG ID of the target HNB is not in the allowed CSG list; it should be noted that the core network can obtain the access mode and the CSG ID of the HNB through a registering flow of the HNB, or request the access mode and the CSG ID of the HNB from the HNB gateway by a dedicated signaling.

After receiving the relocation preparation failure signaling, the source RNC or the source HNB starts a timer; before the timer is overtime, the source RNC or the source HNB prevents the UE from sending (that is, no longer sends for the UE) the handover required or relocation required signaling to the target HNB. When the timer is running, the network side and the UE both may have updated the allowed CSG list; after the timer is overtime, if the measurement report indicating the signal of the target HNB cell is good sent by the UE is still received, the source RNC or the source HNB sends the relocation required signaling to the target HNB again.

It should be noted that when the core network performs the access control for the handover and finds that the target CSG cell is not in the allowed CSG list, the core network directly initiates an NAS flow to update the allowed CSG list of the UE; the core network can send the NAS signaling included in the relocation preparation failure, after receiving the signaling, the source RNC or the source HNB sends the NAS information (through a DL direct transfer or other air interface signaling including the NAS information) to the UE; when receiving the NAS information, the UE updates the allowed CSG list thereof. The core network can also send the NAS signaling included in the separated NAS information (a direct transfer) or other signaling to update the allowed CSG list of the UE.

Embodiment 3

FIG. 1 shows a schematic diagram of a network layout of an LTE system. An S1 interface is arranged between a core network and a NodeB (a macro NodeB), an X2 interface is arranged between the neighboring NodeBs; an HNB can be connected directly with the core network, or connected with the core network through an HNB gateway; there is no X2 interface arranged between the HNBs and between the HNB and the macro NodeB. A UE is located in a cell belonging to a source NodeB, and is connected; the UE has an access-allowed CSG cell list. The source NodeB may be a macro NodeB or an HNB. In this embodiment, a target HNB (in a closed mode) is connected with the core network directly.

Figure 5:
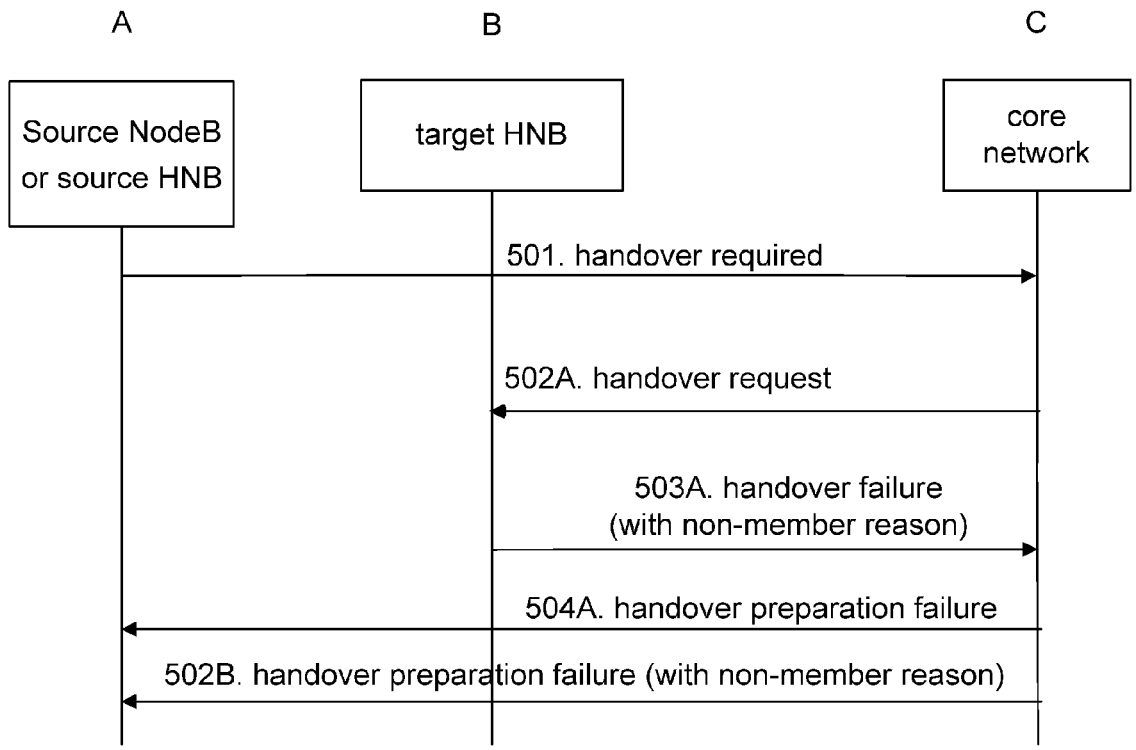
FIG. 5 shows a flowchart of failure of a handover to a target HNB cell according to embodiment 3 of the disclosure.

The flowchart of the handover access control failure caused by the UE being not a member is shown in FIG. 5. Hereby the target HNB or the core network performs the access control for the handover, in the same method stated in embodiment 1, thus it will not be detailed.

After receiving the handover preparation failure information, the source NodeB or a source HNB receives the reason that the UE is not a member. Because the source NodeB or the source HNB obtains a CSG ID of a target HNB cell through a measurement report of the UE, it prevents the UE from sending a handover required signaling to a target HNB cell with identical CSG ID. It should be noted that the handover required signaling is sent to the target HNB cell by the source NobeB or the source HNB, which means it will not send the handover required signaling to the target HNB cell with identical CSG ID for the UE.

Embodiment 4

FIG. 1 shows a schematic diagram of a network layout of an LTE system. An S1 interface is arranged between a core network and a NodeB (a macro NodeB), an X2 interface is arranged between the neighboring NodeBs; an HNB can be connected directly with the core network, or connected with the core network through an HNB gateway; there is no X2 interface arranged between the HNBs and between the HNB and the macro NodeB. A UE is located in a cell belonging to a source NodeB, and is connected; the UE has an access-allowed CSG cell list. The source NodeB may be a macro NodeB or an HNB.

The source NodeB or a source HNB determines that the UE needs to be handed over according to a measurement report submitted by the UE and a target cell is a cell belonging to the HNB; the source NodeB or the source HNB performs handover access control; the source NodeB or the source HNB performs the access control according to an allowed CSG list of the UE, a CSG ID and an access mode (in a closed mode) of a target CSG cell; if the UE is not a member subscriber of the target HNB (or the CSG ID of the target HNB is not in the allowed CSG list of the UE), then the source NodeB notifies the UE to perform an update of the allowed CSG list through an air interface signaling (an RRC signaling or an NAS signaling, or other signaling), and the UE initiates a new tracking area update flow to update the allowed CSG list thereof; or a timer is started, before the timer is overtime, the source NodeB or the source HNB prevents choosing (no longer chooses) the target HNB to be the handover target cell of the UE; or the source NodeB or the source HNB prevents the UE from sending (no longer sends for the UE) the handover request to the target HNB cell with identical CSG ID. It should be noted that if the source NodeB or the source HNB or the source RNC performs the access control, it needs to obtain the CSG ID and the access mode of the target CSG cell through sending a signaling to the core network separately. The allowed CSG list of the UE may be included in a handover restriction list, which is configured by the core network and stored in the source NodeB or the source HNB or the source RNC; if the source NodeB or the source HNB or the source RNC include no allowed CSG list of the UE, it needs to obtain the allowed CSG list of the UE through sending a signaling to the core network separately; the source NodeB or the source HNB or the source RNC can also obtain the CSG ID and the access mode of the target CSG cell, the allowed CSG list of the UE simultaneously through sending one signaling to the core network.

Embodiment 5

Figure 6:
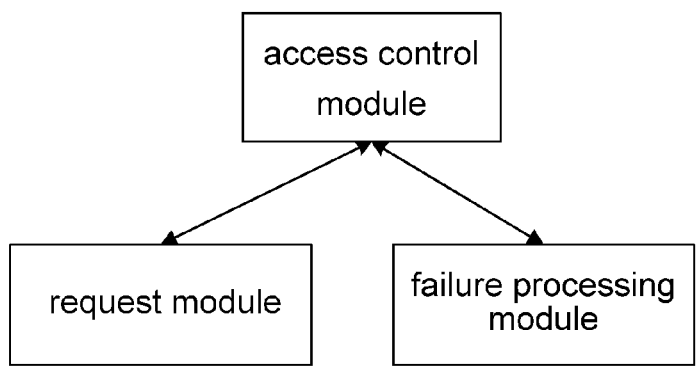
FIG. 6 shows a structure diagram of a system for processing failure of a handover to a CSG cell according to the disclosure.

Based on the method of the disclosure, the disclosure also provides a system for processing the failure of a handover to a CSG cell. A structure of the system is shown in FIG. 6, which comprises: a request module, an access control module and a failure processing module;

the request module, located in a source NodeB, or a source RNC or a source HNB, is configured to choose a target CSG cell as a handover-target cell according to a measurement report of a UE to be handed over, and send a handover required signaling or a relocation required signaling for handing over to the CSG cell to a core network; preferably, the target CSG cell is a CSG cell in a closed mode;

the access control module, located in the core network, or a target HNB gateway, or a target HNB, is configured to determine whether the UE to be handed over is an authorized subscriber or a member subscriber of the target CSG cell, or whether the target CSG cell is in an allowed CSG list of the UE to be handed over; if no, the access control module sends a handover preparation failure signaling or a relocation preparation failure signaling with non-member reason to the failure processing module through the core network; and the failure processing module, located in the source NodeB, or the source RNC or the source HNB, is configured to perform corresponding handover failure processing operation after receiving the handover preparation failure signaling or the relocation preparation failure signaling.

Further, when the access control module is located in the target HNB gateway or the target HNB, the core network sends a handover request signaling or a relocation request signaling to the access control module after receiving the handover required signaling or the relocation required signaling; if the access control module determines that the UE to be handed over is not an authorized subscriber or a member subscriber of the target CSG cell, or the target CSG cell is not in the allowed CSG list of the UE to be handed over, it returns a handover failure signaling or a relocation failure signaling with non-member reason to the core network; after receiving the handover failure signaling or the relocation failure signaling with non-member reason, the core network sends the handover preparation failure signaling or the relocation preparation failure signaling with non-member reason to the request module.

Further, the handover failure processing operation comprises one or more of the following processes:

(1) the failure processing module notifies the UE to be handed over to perform the update of the allowed CSG list through an air interface signaling, or performs an update of the allowed CSG list of the UE to be handed over through a C1 interface, or notifies the core network to perform the update of the allowed CSG list of the UE to be handed over;

(2) the failure processing module starts a timer; before the timer is overtime, the failure processing module prevents the UE to be handed over from sending the handover required signaling or the relocation required signaling to the target CSG cell; and (3) the failure processing module prevents the UE to be handed over from sending the handover required signaling or the relocation required signaling to the target HNB cell with the identical CSG ID.

The above are only the preferred embodiments of the disclosure and not intend to limit the protection scope of the disclosure. For those skilled in the prior art, the disclosure can be modified and changed in various ways. Any modifications, equal replacements and improvements made within the spirit and principle of the disclosure shall all be covered in the protection scope of the disclosure.

What is claimed is:

1. A method for processing failure of a handover to a Closed Subscriber Group (CSG) cell, comprising:
    sending, by a source NodeB or a source Radio Network Controller (RNC) or a source Home NodeB (HNB), a handover required signaling or a relocation required signaling for a User Equipment (UE) handing over to a target CSG cell;
    receiving, by the source NodeB or the source RNC or the source HNB, a handover preparation failure signaling or a relocation preparation failure signaling with non-member reason when access control of the UE to be handed over fails;
    performing, by the source NodeB or the source RNC or the source HNB, handover failure processing operation after receiving the handover preparation failure signaling or the relocation preparation failure signaling;
    wherein the performing handover failure processing operation comprises: preventing, by the source NodeB or the source RNC or the source HNB, the UE to be handed over from sending a handover required signaling or a relocation required signaling to a target HNB cell with identical CSG Identity (ID).

2. The method according to claim 1, wherein the access control fails comprises: performing the access control by a core network or a target HNB gateway or a target HNB, determining that the UE to be handed over is not an authorized subscriber or a member subscriber of the target CSG cell, or determining that the target CSG cell is not in an allowed CSG list of the UE to be handed over.

3. The method according to claim 2, wherein the receiving a handover preparation failure signaling or a relocation preparation failure signaling with non-member reason when access control of the UE to be handed over fails comprises:
    when performing the access control by the target HNB gateway or the target HNB,
    after receiving the handover required signaling or the relocation required signaling, sending, by the core network, a handover request signaling or a relocation request signaling to the target HNB or the target HNB gateway, or to the target HNB through the target HNB gateway;
    when the access control fails, returning, by the target HNB or the target HNB gateway, a handover failure signaling or a relocation failure signaling with non-member reason to the core network; and
    after receiving the handover failure signaling or the relocation failure signaling with non-member reason, sending, by the core network, the handover preparation failure signaling or the relocation preparation failure signaling with non-member reason to the source NodeB or the source RNC or the source HNB.

4. The method according to claim 1, wherein the performing handover failure processing operation further comprises:
    notifying, by the source NodeB or the source RNC or the source HNB, the UE to be handed over to perform an update of the allowed CSG list; or
    triggering, by a network side, the UE to be handed over to perform an update of the allowed CSG list.

5. The method according to claim 4, wherein the triggering the UE to be handed over to perform an update of the allowed CSG list comprises:
    notifying, by the network side, the UE to be handed over to perform the update of the allowed CSG list through an air interface signaling; or
    triggering, by the network side, the update of the allowed CSG list of the UE to be handed over through a C1 interface; or
    performing, by the core network, the update of the allowed CSG list of the UE to be handed over.

6. The method according to claim 1, wherein the performing handover failure processing operation further comprises:
    starting, by the source NodeB or the source RNC or the source HNB, a timer;
    before the timer is overtime, preventing, by the source NodeB or the source RNC or the source HNB, the UE to be handed over from sending the handover required signaling or the relocation required signaling to the target CSG cell.

7. A device for processing failure of a handover to a Closed Subscriber Group (CSG) cell, which is in a source NodeB or a source Radio Network Controller (RNC) or a source Home NodeB (HNB), comprising a request module, a receiving module and a failure processing module, wherein:
    the request module is configured to send a handover required signaling or a relocation required signaling for a User Equipment (UE) handing over to a target CSG cell;
    the receiving module is configured to receive a handover preparation failure signaling or a relocation preparation failure signaling with non-member reason when access control of the UE to be handed over fails; and
    the failure processing module is configured to perform handover failure processing operation after receiving the handover preparation failure signaling or the relocation preparation failure signaling;
    wherein the failure processing module is further configured to prevent the UE to be handed over from sending a handover required signaling or a relocation required signaling to a target HNB cell with identical CSG Identity (ID).

8. The device according to claim 7, further comprising: an access control module, in a core network or a target HNB gateway or a target HNB, configured to perform the access control when receiving the handover required signaling or the relocation required signaling;
    wherein the access control module is further configured to determine that the UE to be handed over is not an authorized subscriber or a member subscriber of the target CSG cell, or determine that the target CSG cell is not in an allowed CSG list of the UE to be handed over.

9. The device according to claim 8, wherein the access control module, in the target HNB gateway or the target HNB, is configured to receive a handover request signaling or a relocation request signaling from the core network after the core network receives the handover required signaling or the relocation required signaling, and to return a handover failure signaling or a relocation failure signaling with non-member reason to the core network when the access control fails; and
    the receiving module is configured to receive the handover preparation failure signaling or the relocation preparation failure signaling with non-member reason from the core network after the core network receives the handover failure signaling or the relocation failure signaling.

10. The device according to claim 7, wherein the failure processing module is further configured to notify the UE to be handed over to perform an update of the allowed CSG list, or to trigger the UE to be handed over to perform an update of the allowed CSG list.

11. The device according to claim 10, wherein the failure processing module is further configured to notify the UE to be handed over to perform the update of the allowed CSG list through an air interface signaling, or to trigger the update of the allowed CSG list of the UE to be handed over through a C1 interface, or to perform the update of the allowed CSG list of the UE to be handed over.

12. The device according to claim 7, wherein the failure processing module is further configured to start a timer, and to prevent the UE to be handed over from sending the handover required signaling or the relocation required signaling to the target CSG cell before the timer is overtime.

13. A system for processing failure of a handover to a Closed Subscriber Group (CSG) cell, comprising a request module, a sending module and a failure processing module, wherein:
the request module, in a source NodeB or a source Radio Network Controller (RNC) or a source Home NodeB (HNB), is configured to send a core network a handover required signaling or a relocation required signaling for a User Equipment (UE) handing over to a target CSG cell;
the sending module, in the core network, is configured to send a handover preparation failure signaling or a relocation preparation failure signaling with non-member reason to the failure processing module when access control of the UE to be handed over fails; and
the failure processing module, in the source NodeB or the source RNC or the source HNB, is configured to perform handover failure processing operation after receiving the handover preparation failure signaling or the relocation preparation failure signaling;
wherein the failure processing module is further configured to prevent the UE to be handed over from sending a handover required signaling or a relocation required signaling to a target HNB cell with identical CSG Identity (ID).

14. The system according to claim 13, further comprising:
an access control module, in a core network or a target HNB gateway or a target HNB, configured to perform the access control when receiving the handover required signaling or the relocation required signaling;
wherein the access control module is further configured to determine that the UE to be handed over is not an authorized subscriber or a member subscriber of the target CSG cell, or determine that the target CSG cell is not in an allowed CSG list of the UE to be handed over.

15. The system according to claim 14, wherein the sending module, in the core network, is configured to send a handover request signaling or a relocation request signaling after receiving the handover required signaling or the relocation required signaling;
the access control module, in the target HNB gateway or the target HNB, is configured to return a handover failure signaling or a relocation failure signaling with non-member reason to the sending module when the access control fails; and
the sending module, in the core network, is configured to send the handover preparation failure signaling or the relocation preparation failure signaling with non-member reason to the failure processing module after receiving the handover failure signaling or the relocation failure signaling.

16. The system according to claim 13, wherein the failure processing module is further configured to notify the UE to be handed over to perform an update of the allowed CSG list, or to trigger the UE to be handed over to perform an update of the allowed CSG list.

17. The system according to claim 16, wherein the failure processing module is further configured to notify the UE to be handed over to perform the update of the allowed CSG list through an air interface signaling, or to trigger the update of the allowed CSG list of the UE to be handed over through a C1 interface, or to perform the update of the allowed CSG list of the UE to be handed over.

18. The system according to claim 13, wherein the failure processing module is further configured to start a timer, and to prevent the UE to be handed over from sending the handover required signaling or the relocation required signaling to the target CSG cell before the timer is overtime.

* * * * *